US012494976B2

(12) United States Patent
Robert et al.

(10) Patent No.: US 12,494,976 B2
(45) Date of Patent: Dec. 9, 2025

(54) ZERO-KNOWLEDGE SERVICE LEVEL AGREEMENT (SLA) MONITORING

(71) Applicant: Telefonaktiebolaget LM Ericsson (publ), Stockholm (SE)

(72) Inventors: Rémi Robert, Solna (SE); Aleksandra Obeso Duque, Solna (SE); Arif Ahmed, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 225 days.

(21) Appl. No.: 18/557,495

(22) PCT Filed: May 4, 2021

(86) PCT No.: PCT/IB2021/053756
§ 371 (c)(1),
(2) Date: Oct. 26, 2023

(87) PCT Pub. No.: WO2022/234323
PCT Pub. Date: Nov. 10, 2022

(65) Prior Publication Data
US 2024/0223473 A1    Jul. 4, 2024

(51) Int. Cl.
*H04L 41/5067* (2022.01)
*H04L 41/5019* (2022.01)

(52) U.S. Cl.
CPC ...... *H04L 41/5067* (2013.01); *H04L 41/5019* (2013.01)

(58) Field of Classification Search
CPC ............ H04L 41/5067; H04L 41/5019
See application file for complete search history.

(56) References Cited

U.S. PATENT DOCUMENTS

| 7,082,463 B1 * | 7/2006 | Bradley | H04L 43/0829 709/224 |
| 2015/0106143 A1 * | 4/2015 | Rai | H04L 41/5051 705/7.14 |

(Continued)

FOREIGN PATENT DOCUMENTS

KR    10-2020-0077445 A    6/2020

OTHER PUBLICATIONS

Alzubaidi, et al., "A Blockchain-Based Approach for Assessing Compliance with SLA-Guaranteed IoT Services," ArXiv:2006.15314 [Cs], Jun. 2020, <http://arxiv.org/abs/2006.15314>, pp. 1-8.

(Continued)

*Primary Examiner* — Raqiul A Choudhury
(74) *Attorney, Agent, or Firm* — Nicholson, De Vos, Webster & Elliott, LLP

(57) ABSTRACT

A method by a computing system implementing a service level agreement (SLA) monitoring client to determine whether a SLA fulfillment status reported by a SLA monitoring agent is valid. The method includes verifying a proof of SLA fulfillment status based on manipulation detection codes of measurements, a SLA fulfillment status, and a verification key, determining whether the measurements are valid based on whether the distributed ledger includes measurement attestations having manipulation detection codes matching the manipulation detection codes of the measurements, and determining that the SLA fulfillment status is valid in response to successfully verifying the proof of SLA fulfillment status and determining that the measurements are valid.

20 Claims, 7 Drawing Sheets

(56) References Cited

U.S. PATENT DOCUMENTS

| | | | |
|---|---|---|---|
| 2015/0229537 A1* | 8/2015 | Little | H04L 41/508 709/201 |
| 2019/0089605 A1* | 3/2019 | Bellini, III | G06Q 10/20 |
| 2020/0241929 A1 | 7/2020 | Arrasjid et al. | |
| 2020/0302563 A1 | 9/2020 | Golway et al. | |
| 2022/0321427 A1* | 10/2022 | Narasimhamurthy | H04L 67/1097 |

OTHER PUBLICATIONS

Bitansky, et al., "From Extractable Collision Resistance to Succinct Non-Interactive Arguments of Knowledge, and Back Again," In Proceedings of the 3rd Innovations in Theoretical Computer Science Conference on-ITCS '12, Jan. 2012, pp. 326-349. Cambridge, Massachusetts: ACM Press. <https://doi.org/10.1145/2090236.2090263>.

Müller, et al., "Blockchain-Based Trusted Cross-organizational Deliveries of Sensor-Equipped Parcels", Springer, May 2020, 12 pages.

Patel, et al., "Service Level Agreement in Cloud Computing," Kno.e.sis Publications, <https://corescholar.libraries.wright.edu/knoesis/78>, Jan. 2009, pp. 1-10.

Petkus, M., "Why and How zk-SNARK Works: Definitive Explanation" arXiv:1906.07221, https://arxiv.org/abs/1906.07221, Jun. 2019, pp. 1-65.

Wikipedia, "Non-interactive zero-knowledge proof", available online at <https://en.wikipedia.org/w/index.php?title=Non-interactive=zero-knoi>, Dec. 2020, 4 pages.

Zhou, et al., "A Blockchain Based Witness Model for Trustworthy Cloud Service Level Agreement Enforcement," IEEE Infocom 2019—IEEE Conference on Computer Communications, Paris, France, Apr. 29-May 2, 2019, pp. 1567-1575, doi: 10.1109/INFOCOM.2019.8737580.

\* cited by examiner

ZERO-KNOWLEDGE SERVICE LEVEL AGREEMENT (SLA) MONITORING

CROSS-REFERENCE TO RELATED APPLICATIONS

This application is a national stage of International Application No. PCT/IB2021/053756, filed May 4, 2021, which is hereby incorporated by reference.

TECHNICAL FIELD

Embodiments of the invention relate to the field of computer networks, and more specifically to monitoring service level agreement (SLA) fulfillment status in computer networks.

BACKGROUND

A service level agreement (SLA) is an agreement between two or more parties, where one of the parties is a service provider and another one of the parties is a service consumer (e.g., a customer of the service provider). The SLA defines the level of performance that is promised by the service provider to the service consumer. The level of performance can be expressed as a key performance indicator (KPI) that is computed based on various measurements. The SLA may define how the measurements are collected, the process for computing the KPI based on the measurements, and the process for determining the SLA fulfillment status.

Typically, the service provider is solely responsible for the collection of the measurements. Moreover, in some cases, the service provider does not automatically warn the service consumer when the SLA is not fulfilled. It is up to the service consumer to notice when the SLA is not fulfilled and request reparation from the service provider.

Some of these issues may be mitigated by techniques that make use of a distributed ledger. Such techniques may use distributed ledger capabilities to store the measurements in an immutable way and leverage smart contracts as a programmatic way to express the SLA fulfillment status and obtain trusted computing. Moreover, such techniques may provide trusted reporting of the measurements using randomly selected witnesses.

In addition to smart contracts, another way to obtain trusted computing is through verifiable computation. With verifiable computation, a mathematical proof is provided with the computation result (computed by the prover) and allows the receiver (the verifier) to verify that the computation was performed correctly. Such a proof can be non-interactive, meaning that it does not require any interaction between the prover and the verifier beyond transmission of the proof and the result. Furthermore, such a proof can also be qualified as "zero-knowledge" if it does not reveal anything beyond the validity of the result (the value of the result and of any intermediary steps are not disclosed). An example of a non-interactive zero-knowledge proving scheme is zero-knowledge succinct non-interactive argument of knowledge (ZK-SNARK).

SUMMARY

A method by a computing system implementing a service level agreement (SLA) monitoring client to determine whether a SLA fulfillment status reported by a SLA monitoring agent is valid. The method includes generating a program adapted for a zero-knowledge proving scheme based on a SLA fulfillment status determination process, generating a proving key and a verification key based on the program adapted for the zero-knowledge proving scheme, providing the proving key to the SLA monitoring agent, where the SLA monitoring agent is to generate a proof of SLA fulfillment status based on the proving key, obtaining the proof of SLA fulfillment status generated by the SLA monitoring agent, the SLA fulfillment status, and manipulation detection codes of measurements used to determine the SLA fulfillment status, verifying the proof of SLA fulfillment status based on the manipulation detection codes of the measurements, the SLA fulfillment status, and the verification key, attempting to obtain, from a distributed ledger, measurement attestations using the manipulation detection codes of the measurements, determining whether the measurements are valid based on whether the distributed ledger includes measurement attestations having manipulation detection codes matching the manipulation detection codes of the measurements, and determining that the SLA fulfillment status is valid in response to successfully verifying the proof of SLA fulfillment status and determining that the measurements are valid.

A set of non-transitory machine-readable media having computer code stored therein, which when executed by a set of one or more processors of a network device implementing a service level agreement (SLA) monitoring client, causes the network device to perform operations for determining whether a SLA fulfillment status reported by a SLA monitoring agent is valid. The operations include generating a program adapted for a zero-knowledge proving scheme based on a SLA fulfillment status determination process, generating a proving key and a verification key based on the program adapted for the zero-knowledge proving scheme, providing the proving key to the SLA monitoring agent, where the SLA monitoring agent is to generate a proof of SLA fulfillment status based on the proving key, obtaining the proof of SLA fulfillment status generated by the SLA monitoring agent, the SLA fulfillment status, and manipulation detection codes of measurements used to determine the SLA fulfillment status, verifying the proof of SLA fulfillment status based on the manipulation detection codes of the measurements, the SLA fulfillment status, and the verification key, attempting to obtain, from a distributed ledger, measurement attestations using the manipulation detection codes of the measurements, determining whether the measurements are valid based on whether the distributed ledger includes measurement attestations having manipulation detection codes matching the manipulation detection codes of the measurements, and determining that the SLA fulfillment status is valid in response to successfully verifying the proof of SLA fulfillment status and determining that the measurements are valid.

A network device to implement a service level agreement (SLA) monitoring client to determine whether a SLA fulfillment status reported by a SLA monitoring agent is valid. The network device includes one or more processors and a non-transitory machine-readable storage medium having stored therein instructions, which when executed by the one or more processors, causes the network device to generate a program adapted for a zero-knowledge proving scheme based on a SLA fulfillment status determination process, generate a proving key and a verification key based on the program adapted for the zero-knowledge proving scheme, provide the proving key to the SLA monitoring agent, where the SLA monitoring agent is to generate a proof of SLA fulfillment status based on the proving key, obtain the proof of SLA fulfillment status generated by the SLA monitoring agent, the SLA fulfillment status, and manipulation detection codes of measurements used to determine the SLA fulfillment status, verify the proof of SLA fulfillment status based on the manipulation detection codes of the measurements, the SLA fulfillment status, and the verification key, attempt to obtain, from a distributed ledger, measurement attestations using the manipulation detection codes of the measurements, determine whether the measurements are valid based on whether the distributed ledger includes measurement attestations having manipulation detection codes matching the manipulation detection codes of the measurements, and determine that the SLA fulfillment status is valid in response to successfully verifying the proof of SLA fulfillment status and determining that the measurements are valid.

A method by a computing system implementing a service level agreement (SLA) monitoring agent to provide a proof of SLA fulfillment status to a SLA monitoring client. The method includes generating a program adapted for a zero-knowledge proving scheme based on a SLA fulfillment status determination process, obtaining a proving key generated by a SLA monitoring client, obtaining measurements collected by one or more probes, generating the proof of SLA fulfillment status based on the measurements, manipulation detection codes of the measurements, a SLA fulfillment status, the program adapted for the zero-knowledge proving scheme, and the proving key, and providing the manipulation detection codes of the measurements, the SLA fulfillment status, and the proof of SLA fulfillment status to the SLA monitoring client.

A set of non-transitory machine-readable media having computer code stored therein, which when executed by a set of one or more processors of a network device implementing a service level agreement (SLA) monitoring agent, causes the network device to perform operations for providing a proof of SLA fulfillment status to a SLA monitoring client. The operations include generating a program adapted for a zero-knowledge proving scheme based on a SLA fulfillment status determination process, obtaining a proving key generated by a SLA monitoring client, obtaining measurements collected by one or more probes, generating the proof of SLA fulfillment status based on the measurements, manipulation detection codes of the measurements, a SLA fulfillment status, the program adapted for the zero-knowledge proving scheme, and the proving key, and providing the manipulation detection codes of the measurements, the SLA fulfillment status, and the proof of SLA fulfillment status to the SLA monitoring client.

A network device to implement a service level agreement (SLA) monitoring agent to provide a proof of SLA fulfillment status to a SLA monitoring client. The network device includes one or more processors and a non-transitory machine-readable storage medium having stored therein instructions, which when executed by the one or more processors, causes the network device to generate a program adapted for a zero-knowledge proving scheme based on a SLA fulfillment status determination process, obtain a proving key generated by a SLA monitoring client, obtain measurements collected by one or more probes, generate the proof of SLA fulfillment status based on the measurements, manipulation detection codes of the measurements, a SLA fulfillment status, the program adapted for the zero-knowledge proving scheme, and the proving key, and provide the manipulation detection codes of the measurements, the SLA fulfillment status, and the proof of SLA fulfillment status to the SLA monitoring client.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
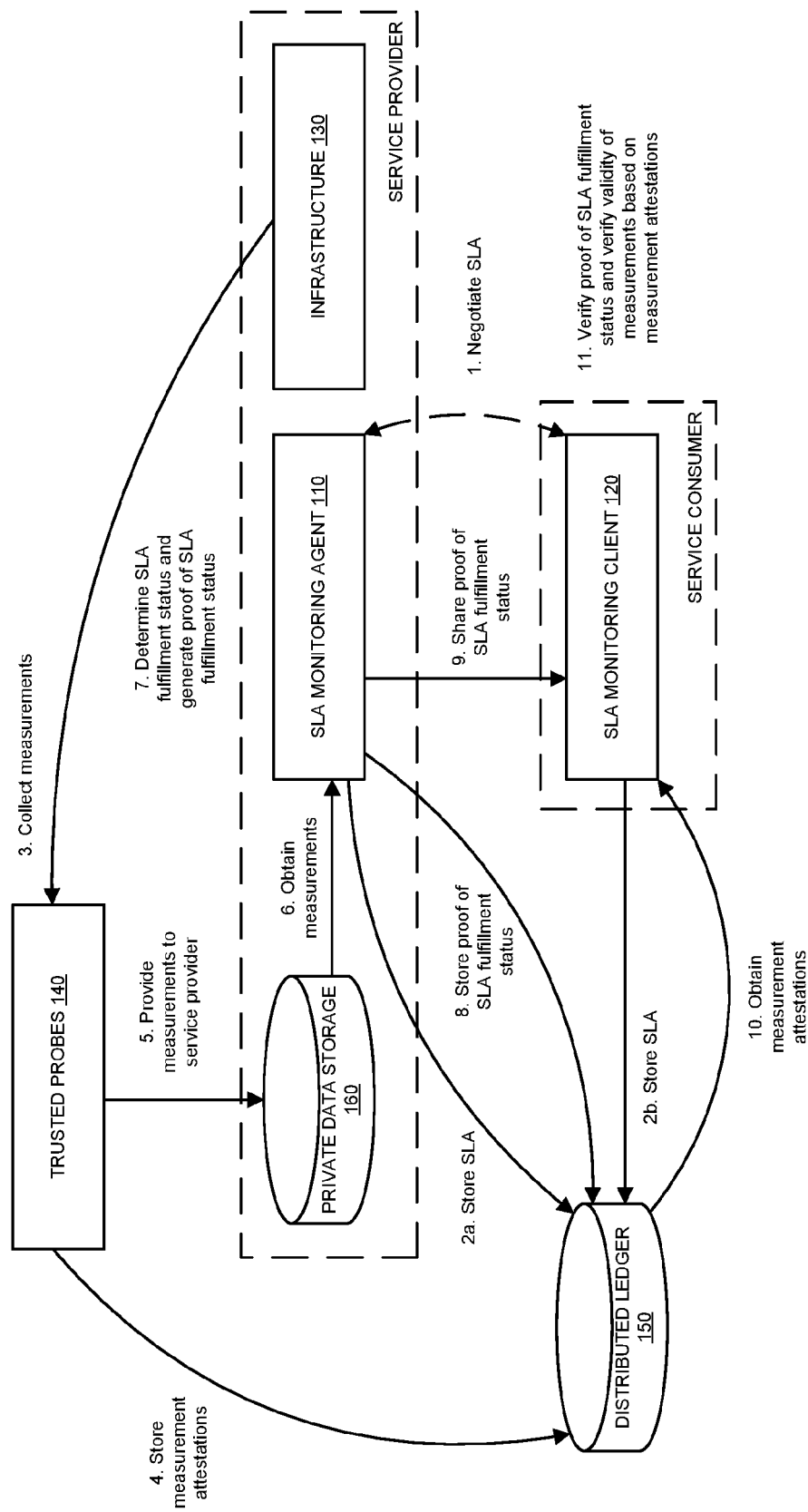
FIG. 1 is a block diagram of a system for monitoring SLA fulfillment status, according to some embodiments.

The following description describes methods and apparatus for monitoring service level agreement (SLA) fulfillment status in a trusted manner. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A drawback of existing SLA fulfillment monitoring techniques is that they expose the measurements and key performance indicators (KPIs) used to determine the SLA fulfillment status. For example, when smart contracts are used to compute the KPI and validate fulfillment of the SLA, it is mandatory that multiple parties are able to access the inputs (e.g., measurements) and intermediary values (e.g., KPIs), as this is a requirement for the smart contract execution to be trusted. The actual number of parties that need access to the information is dependent on the configuration of the distributed ledger and who needs to trust the result.

This issue is especially present if the service provider would like to broadly and/or regularly disclose the SLA fulfillment status (e.g., whether the SLA was fulfilled or not) without having to disclose the measurements or KPIs. Such a feature would be desirable, for example, to: (1) build a reputation system based on the fulfillment of the SLA without having to disclose anything about the actual measurements, KPIs, or service level objectives (SLOs) (e.g., target values for the KPIs); and/or (2) provide the service consumer with continuous proof that the SLA is being fulfilled without having to involve other parties to determine the SLA fulfillment status. Ideally, the service provider would like to prove that it has fulfilled the SLA without having to expose any unnecessary information.

Embodiments disclosed herein allow for monitoring SLA fulfillment in a trusted manner by taking advantage of certain properties of distributed ledgers and non-interactive zero-knowledge proofs. Embodiments allow the service provider to broadly share the SLA fulfillment status in a trusted manner while revealing as little information as possible. According to some embodiments, the process involves three phases: (1) a SLA processing definition phase; (2) a measurement collection phase; and (3) a SLA fulfillment proving phase.

In the SLA processing definition phase, a process for determining the SLA fulfillment status is defined that takes some measurements as input and outputs the SLA fulfillment status (e.g., indicating whether the SLA is fulfilled or not or the level of SLA fulfillment). Based on this process definition, the provers and verifiers (e.g., the service provider and service consumer, respectively) generate materials that will allow for the generation of non-interactive zero-knowledge proofs as well as their verification.

In the measurement collection phase, a group of trusted probes (either hardware, software, and/or human organizations) collect measurements (e.g., measurements that are needed to determine whether the SLA is being fulfilled), notarize the measurements in a distributed ledger, and share the measurements with the service provider.

In the SLA fulfillment proving phase, when the service provider wishes to provide proof of its SLA fulfillment status, it can generate the proof based on the measurements that were provided by the trusted probes in addition to the materials generated in the previous phase. The service provider may provide the proof, the hashes of the measurements (or other type of manipulation detection code), and the SLA fulfillment status to any other party that wishes to verify that the SLA fulfillment status reported by the service provider is valid/trustworthy. The SLA fulfillment status may be determined to be valid/trustworthy if the proof is valid and the measurements are valid. The measurements may be determined to be valid by comparing the hashes of the measurements to the notarized measurements stored in the distributed ledger during the measurement collection phase. In some embodiments, the SLA fulfillment status (along with the proof and the hashes of the measurements) is stored in the distributed ledger and its validity can be verified within a smart contract executed by the distributed ledger.

An embodiment is a method by a computing system implementing a service level agreement (SLA) monitoring agent to provide a proof of SLA fulfillment status to a SLA monitoring client. The method includes generating a program adapted for a zero-knowledge proving scheme based on a SLA fulfillment status determination process, obtaining a proving key generated by a SLA monitoring client, obtaining measurements collected by one or more probes, generating the proof of SLA fulfillment status based on the measurements, manipulation detection codes of the measurements, a SLA fulfillment status, the program adapted for the zero-knowledge proving scheme, and the proving key, providing the manipulation detection codes of the measurements, the SLA fulfillment status, and the proof of SLA fulfillment status to the SLA monitoring client.

Another embodiment is a method by a computing system implementing a SLA monitoring client to determine whether a SLA fulfillment status reported by a SLA monitoring agent is valid. The method includes generating a program adapted for a zero-knowledge proving scheme based on a SLA fulfillment status determination process, generating a proving key and a verification key based on the program adapted for the zero-knowledge proving scheme, providing the proving key to the SLA monitoring agent, where the SLA monitoring agent is to generate a proof of SLA fulfillment status based on the proving key, obtaining the proof of SLA fulfillment status generated by the SLA monitoring agent, the SLA fulfillment status, and manipulation detection codes of measurements used to determine the SLA fulfillment status, verifying the proof of SLA fulfillment status based on the manipulation detection codes of the measurements, the SLA fulfillment status, and the verification key, attempting to obtain, from a distributed ledger, measurement attestations using the manipulation detection codes of the measurements, determining whether the measurements are valid based on whether the distributed ledger includes measurement attestations having manipulation detection codes matching the manipulation detection codes of the measurements, and determining that the SLA fulfillment status is valid in response to successfully verifying the proof of SLA fulfillment status and determining that the measurements are valid.

Using embodiments disclosed herein, only the service provider may have access to the actual values of the KPIs used in the SLA fulfillment status determination process. Only the measurements have the possibility to be collected by third parties (and thus visible to them). However, this can be done in such a way that it provides the third parties with as little information as possible (e.g., by distributing the collection of measurements among multiple randomly selected entities). The mechanism used to verify the fulfillment of the SLA based on the measurements is pre-defined and anyone (with access to the distributed ledger) can obtain proof that the SLA fulfillment status has been determined correctly.

It is possible to control the amount of information that is to be disclosed with the proof. In a simple embodiment, only the measurements are kept secret. However, in other embodiments, the SLO or even the metrics being used for the measurements could be kept secret from some verifiers. The service consumer could be aware of the SLO and metrics being used for the measurements. However, any other verifier could be made ignorant of these. Embodiments will now be described with reference to the accompanying diagrams.

FIG. 1 is a block diagram of a system for monitoring SLA fulfillment status, according to some embodiments. As shown in the diagram, the system includes a SLA monitoring agent 110, a SLA monitoring client 120, an infrastructure 130, trusted probes 140, a distributed ledger 150, and a private data storage 160. The SLA monitoring agent 110, the infrastructure 130, and the private data storage 160 are in the realm of a service provider (they are owned, operated, or otherwise controlled by the service provider). The SLA monitoring client 120 is in the realm of a service consumer (it is owned, operated, or otherwise controlled by the service consumer). The service provider may be any entity that provides a service to a consumer, where the service is covered by a SLA. In the example shown in the diagram and used throughout this description, the service provider provides a networking service (via the infrastructure 130) to the service consumer. It is assumed that there can be a SLA binding the service provider and the service consumer.

Trusted Probes

The trusted probes 140 may be entities defined in the SLA as being trusted for collecting measurements from the infrastructure 130 to be used for determining the SLA fulfillment status. There may be one or more trusted probes 140 in the system. The trusted probes 140 may collect the measurements in a passive manner (e.g., by observing the network traffic within the infrastructure 130 without affecting it) and/or in an active way (e.g., by querying a server hosted by the infrastructure 130). The trusted probes 140 may be implemented using hardware and/or software components. There could be multiple reasons for a trusted probe 140 to be trusted. For example, a trusted probe 140 may be trusted because the hardware and/or software used by the trusted probe 140 have been audited and proven to conform to the expectations of all parties, the organization operating the trusted probes 140 are deemed trustworthy, and/or the measurement collection process used by the trusted probes 140 leverage a trusted computation scheme (e.g., comparison of multiple separate measurements and/or trusted execution environment in a central processing unit (CPU)).

After collecting the measurements, the trusted probes 140 may notarize the measurements in the distributed ledger. The notarized measurements may be referred herein as measurement attestations. In one embodiment, the measurement attestations include the following information: (1) timestamps of when the measurements were collected; (2) the metrics used for the measurements (e.g., the unit of measurement); and (3) hashes of the measurements (e.g., covering at least the actual measurement values and possibly also the timestamps and metrics used for the measurements). Hashes are used herein as an example of a manipulation detection code. A manipulation detection code can be any type of code/value that can be used to ensure that a value has not been manipulated. Other embodiments may use a different type of manipulation detection code. The trusted probes 140 may also send the measurements to the service provider for the service provider to store in its private data storage 160.

In the diagram, the trusted probes 140 are shown as being outside of the realm of the service provider. However, in some embodiments, the service provider may operate some or all of the trusted probes 140. In such an embodiment, the trust may come from a technical argument (e.g., through the use of trusted computing).

Distributed Ledger

The distributed ledger 150 may be a system that stores data in a distributed manner and possibly executes smart contracts (e.g., a blockchain). In one embodiment, the distributed ledger 150 provides features allowing a participant to have a private state that is not shared with all of the participants of the distributed ledger 150 but still covered by the immutability guarantees of the distributed ledger 150 (e.g. Hyperledger Fabric private data). Depending on the business requirements, the distributed ledger 150 may be a private distributed ledger or a public distributed ledger.

Infrastructure

The infrastructure 130 may host a service provided by the service provider to the service consumer. In one embodiment, the infrastructure 130 is a computer network providing a networking service to the service consumer. The infrastructure 130 may allow the trusted probes 140 to collect measurements needed for determining the SLA fulfillment status.

Private Data Storage

The private data storage 160 may be a data storage that is private to the service provider (e.g., accessible to the service provider but not to the service consumer or other entities). The private data storage 160 may be implemented in the distributed ledger 150 (e.g., a private database component in the case of Hyperledger Fabric) or implemented separately from the distributed ledger (e.g., as a more traditional data storage such as a relational database).

SLA Monitoring Agent

The SLA monitoring agent 110 may handle SLA negotiations and determine the SLA fulfillment status, as well as generate and report proofs of SLA fulfillment status (e.g., following the rules defined in the SLA). The SLA monitoring agent 110 may also acknowledge reception and correctness of the measurements collected by the trusted probes in the distributed ledger 150 (e.g., if there is a need for the service provider to prove that it is correctly receiving the measurements from the trusted probes 140).

SLA Monitoring Client

The SLA monitoring client 120 may handle SLA negotiations and monitor the SLA fulfillment status. As part of this role, the SLA monitoring client 120 may verify that the SLA fulfillment status reported by the SLA monitoring agent 110 is valid using materials that have been stored in the distributed ledger (e.g., proofs, measurement attestations and SLA definition). The SLA monitoring client 120 may be implemented as a "traditional" component or implemented as a smart contract installed in the distributed ledger (e.g., if there is a need for broad distribution of the proofs or use as input to additional smart contracts).

Example Operations

Example operations of the system will now be described with reference to the block diagram. At operation 1, the SLA monitoring agent 110 and the SLA monitoring client 120 negotiate the SLA. Once an agreement on the SLA is reached, at step 2, the SLA monitoring agent 110 and/or the SLA monitoring client 120 store the SLA in the distributed ledger 150 (e.g., at operation 2a and/or operation 2b). At operation 3, the trusted probes 140 collect measurements from the infrastructure 130. At operation 4, the trusted probes 140 store measurement attestations in the distributed ledger 150. At operation 5, the trusted probes 140 provide the measurements to the service provider and the service provider stores the measurements in the private data storage 160. At operation 6, the SLA monitoring agent 110 obtains the measurements from the private data storage 160. At operation 7, the SLA monitoring agent 110 determines a SLA fulfillment status (based on the measurements) and generates a proof of SLA fulfillment status (using a zero-knowledge proving scheme). At operation 8, the SLA monitoring agent 110 stores the proof of SLA fulfillment status (and the public input used for proof generation such as the SLA fulfillment status and hashes of the measurements used to determine the SLA fulfillment status) in the distributed ledger 150. At operation 9, the SLA monitoring agent 110 shares the proof of SLA fulfillment status (and the public input used for proof generation) with the SLA monitoring client 120. At operation 10, the SLA monitoring client 120 attempts to obtain the measurement attestations from the distributed ledger 150. At operation 11, the SLA monitoring client 120 verifies the proof of SLA fulfillment status (using the zero-knowledge proving scheme with the public input) and verifies the validity of the measurements. The SLA monitoring client 120 may determine that the measurements are valid if measurement attestations corresponding to the measurements exist in the distributed ledger 150. If the SLA monitoring client 120 is able to successfully verify both (verify the proof of SLA fulfillment status and also verify the validity of the measurements), then the SLA monitoring client 120 may determine that the SLA fulfillment status is valid/trustworthy.

Figure 2:
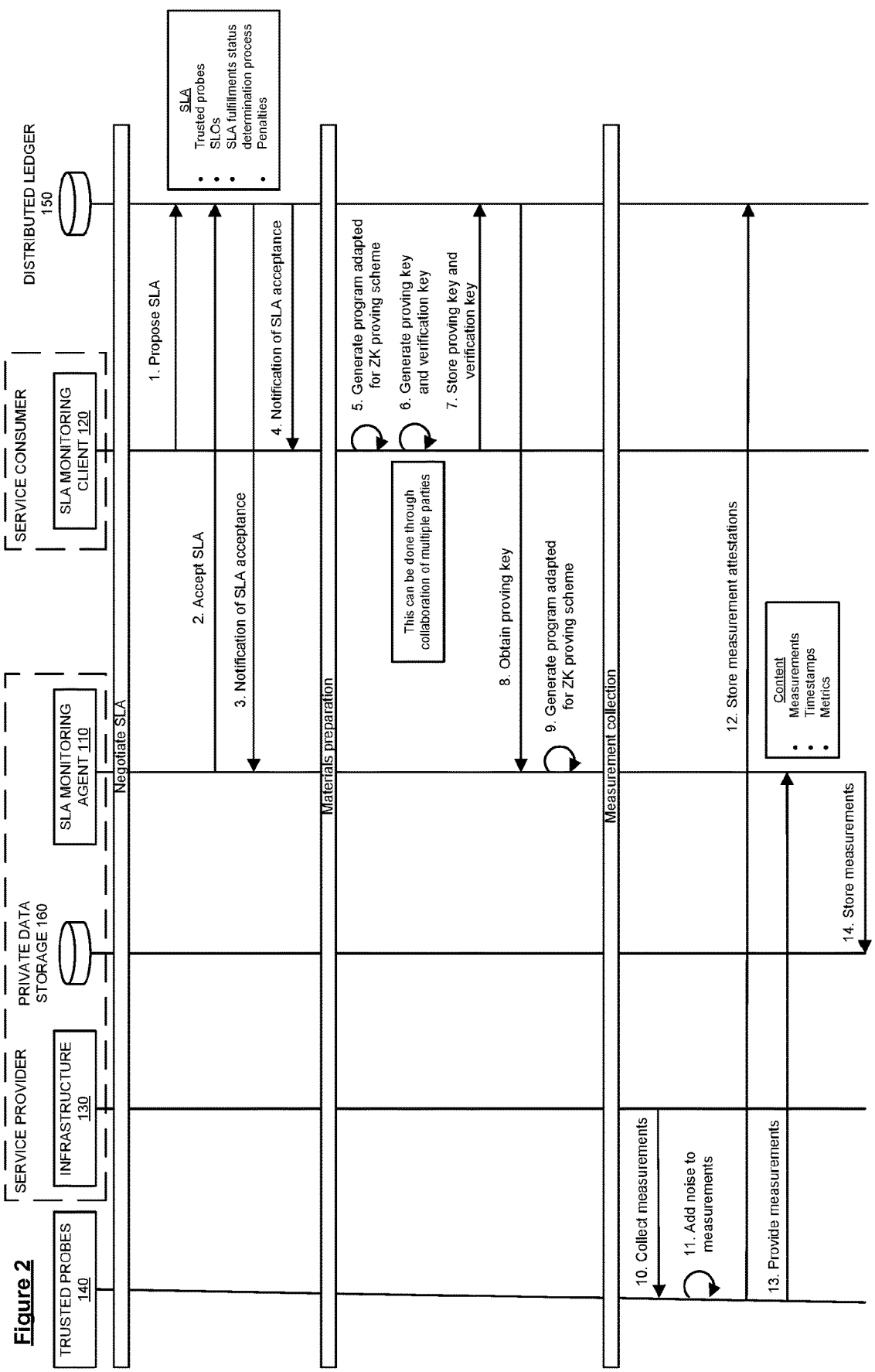
FIG. 2 is a diagram illustrating interactions between the components of the system to monitor SLA fulfillment status, according to some embodiments.
Figure 2:
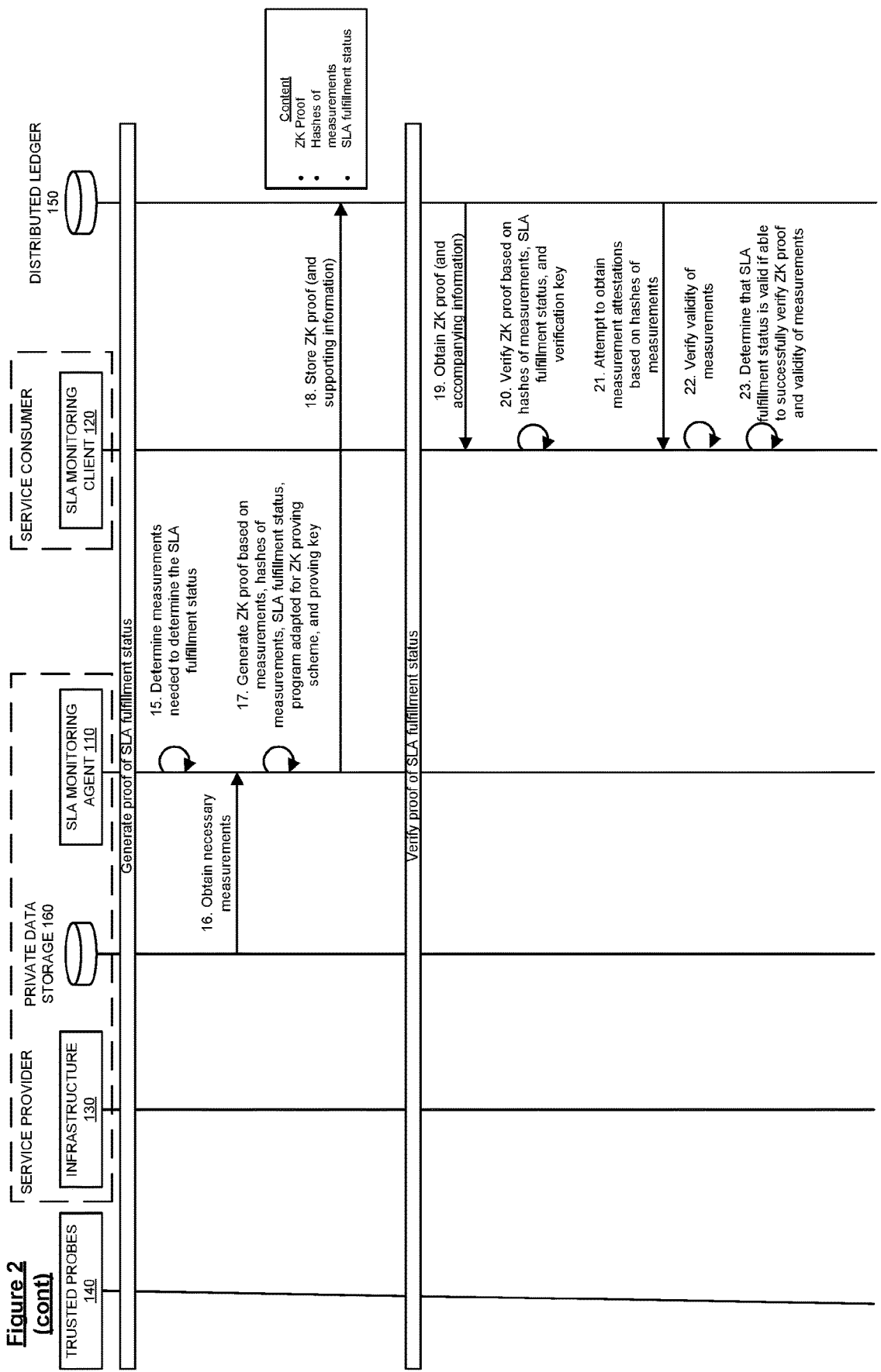

FIG. 2 is a diagram illustrating interactions between the components of the system to monitor SLA fulfillment status, according to some embodiments. The interactions may be organized into a negotiate SLA phase, a materials preparation phase, a measurement collection phase, a generate proof of SLA fulfillment status phase, and a verify proof of SLA fulfillment status phase, each of which is further described herein below.

Negotiate SLA Phase

In this phase, the parties involved in the SLA (in this example there are two parties (the service provider and the service consumer) but this could be generalized to n parties) negotiate the terms of the SLA. In one embodiment, the parties negotiate the following terms of the SLA:

(1) Trusted probes: this is the set of entities that are allowed to collect measurements to be used to determine the SLA fulfillment status. In one embodiment, the trusted probes 140 and/or the measurements collected by the trusted probes 140 are authenticated (e.g., through the use of asymmetric cryptography, in which case the SLA negotiation may include the exchange of public keys and/or certificates of the trusted probes 140, as well as the types of measurements they are allowed to collect).

(2) SLOs: this defines what KPIs will be covered by the SLA and the target values for these KPIs.

(3) SLA fulfillment status determination process: this defines the sequence of instructions, using the measurements (and their hashes) as input, that is used to compute the KPIs defined by the SLOs and then compare them to the SLO target values to determine the SLA fulfillment status (e.g., an indication of whether the SLA is fulfilled or not or an indication of the level of fulfillment).

(4) Penalties: this defines the penalties to apply in case the SLA is not fulfilled. The penalties may include an action that is automatically applied by the distributed ledger 150 (e.g. via the execution of smart contracts) or an action that is to be applied externally. With the latter, the distributed ledger 150 may record the fact that some action is to be applied and it is the responsibility of another entity to carry out the action.

As shown in the diagram, at operation 1, the service consumer, via its SLA monitoring client 120, may propose an SLA using the mechanisms provided by the distributed ledger 150. At operation 2, the service provider, via its SLA monitoring agent 110, may accept the SLA proposed by the service consumer. In some cases, the service provider may modify the proposed SLA and submit the modified proposal to the service consumer for further negotiation. The service provider and the service consumer may repeat this process until an agreement is reached on the SLA.

Once an agreement is reached on the SLA, at operation 3, the SLA monitoring agent 110 may receive a notification of the acceptance of the SLA by all the parties. This may trigger a setup process in the SLA monitoring agent 110 (e.g., starting at operation 8). At operation 4, the SLA monitoring client 120 may also receive a notification of the acceptance of the SLA by all the parties. This may trigger a setup process in the SLA monitoring client 120 (e.g., starting at operation 5).

Materials Preparation Phase

In this phase, the different entities involved in the zero-knowledge proving scheme prepare the materials that will be used in the proof generation/verification process. The actual materials depend on the zero-knowledge proving scheme being used. For the sake of illustration, embodiments are primarily described in a context where the zero-knowledge proving scheme being used is zero-knowledge succinct non-interactive argument of knowledge (ZK-SNARK). It should be understood that ZK-SNARK is merely used as an example, and that other embodiments may use a different zero-knowledge proving scheme to achieve the same/similar functionality.

At operation 5, the SLA monitoring client 120 generates a program adapted for the proving scheme based on the SLA fulfillment status determination process included in the SLA. In one embodiment, the program adapted for the proving scheme is an arithmetic circuit (e.g., if ZK-SNARK is being used as the zero-knowledge proving scheme). At operation 6, the SLA monitoring client 120 generates a proving key and a verification key based on the program adapted for the proving scheme and a secret value. If the only entity that is expected to verify the proofs is the service consumer, it may be sufficient to have this process exclusively in the SLA monitoring client 120. If the proofs are to be verified in a broader context, then this step may be performed through the collaboration of multiple unrelated parties (e.g., involving other peers from the distributed ledger 150). At operation 7, the SLA monitoring client 120 stores the proving key and the verification key in the distributed ledger 150. As will be further described herein, the proving key may be used to generate proofs and the verification key may be used to verify those proofs.

At operation 8, the SLA monitoring agent 110 obtains the proving key from the distributed ledger 150. At operation 9, the SLA monitoring agent 110 generates the program adapted for the proving scheme based on the SLA fulfillment status determination process included in the SLA. This program should be the same as the program generated by the SLA monitoring client at operation 5.

Measurement Collection Phase

In this phase, the measurements that will be used as input to the SLA fulfillment status determination process are collected and notarized in the distributed ledger 150.

At operation 10, the trusted probes 140 collect measurements from the infrastructure 130 providing the service covered by the SLA. The measurement collection mechanism and/or the formatting of the measurements may vary depending on the actual implementation. At operation 11, the trusted probes 140 may add some noise to the measurements to help reduce the risk of an attacker guessing the actual measurement values based on the hashes of the measurements. Preferably, the noise should be negligible when compared to the measurement values or explicitly discarded during the SLA fulfillment status determination process (e.g., by bitwise shifting the measurements to the right in the case of an unsigned integer value).

At operation 12, the trusted probes 140 store measurement attestations in the distributed ledger (to notarize the measurements). The measurement attestations may include information about the measurements in cleartext (e.g., the metrics used for the measurements and measurement timestamps), as well as a hash over the whole data (e.g., hash over the measurements, the metrics used for the measurements, and the measurement timestamps) or only a subset of the data (e.g., hash over the measurements but not the metrics or timestamps). As mentioned above, hashes are an example of a manipulation detection code. Other embodiments may use a different type of manipulation detection code. In one embodiment, the measurement attestations are stored in the distributed ledger 150 in a way that allows for easy/quick retrieval based on the hashes of the measurements (e.g., the hashes can be the key of the key-value pair). At operation 13, the trusted probes 140 provide the collected measurements and information about the measurements (e.g., timestamps and metrics) to the SLA monitoring agent 110. In one embodiment, the SLA monitoring agent 110 acknowledges the reception of the measurements and the correctness of the measurement attestations stored by the trusted probes 140 in the distributed ledger 150. At operation 14, the SLA monitoring agent 110 stores the measurements (and the information about the measurements) in the private data storage 160.

Generate Proof of Correct SLA Fulfillment Status Phase

In this phase, the SLA monitoring agent 110 generates a proof of SLA fulfillment status. At operation 15, the SLA monitoring agent 110 determines the input measurements it needs to determine the SLA fulfillment status. This could include, for example, a number of measurements covering several different metrics during the last hour (or other suitable timeframe). The actual requirements may be defined within the SLA fulfillment status determination process. At operation 16, the SLA monitoring agent 110 obtains the input measurements from the private data storage 160 and determines the SLA fulfillment status. At operation 17, the SLA monitoring agent 110 generates a zero-knowledge proof based on the measurements, hashes of the measurements, the SLA fulfillment status, the program adapted for the proving scheme, and the proving key following the protocol of the zero-knowledge proving scheme (e.g., the hashes of the measurements and the SLA fulfillment status are the "public inputs" to the zero-knowledge proving scheme; the measurements are the "private inputs" to the zero-knowledge proving scheme). At operation 18, the SLA monitoring agent 110 stores the generated proof and other supporting information (e.g., the public inputs such as the hashes of the measurements and the SLA fulfillment status) in the distributed ledger 150. It is up to the specific implementation to decide how broadly accessible the proof should be. In some cases, it may only be shared with the service consumer, while in other cases, the proof is shared with all the members of the distributed ledger 150. In one embodiment, the proof is not stored in the distributed ledger 150 but directly communicated to other parties that want to verify it.

Verify Proof of Correct SLA Compliance Determination Phase

In this phase, the SLA monitoring client 120 verifies the proof generated by the SLA monitoring agent 110. At operation 19, the SLA monitoring client 120 obtains the proof (and supporting information such as the hashes of the measurements and the SLA fulfillment status, and possibly the verification key if it does not have it already) from the distributed ledger 150. This operation may be triggered by the SLA monitoring client 120 detecting that a new proof is available (e.g., based on receiving a notification from the distributed ledger 150). At operation 20, the SLA monitoring client 120 verifies the zero-knowledge proof following the protocol of the zero-knowledge proving scheme. For example, the SLA monitoring client 120 may verify the proof based on the hashes of the measurements, the SLA fulfillment status, and the verification key (e.g., the hashes of the measurements and the SLA fulfillment status are the "public inputs" to the zero-knowledge proving scheme).

At operation 21, the SLA monitoring client 120 attempts to obtain measurement attestations from the distributed ledger 150 based on the hashes of the measurements (e.g., using the hashes as an index/key). The use of the distributed ledger 150 helps with ensuring that the measurements have not been tampered with between the time of their collection and their use in the SLA fulfillment status determination process. At operation 22, the SLA monitoring client 120 verifies the validity of the input measurements. The SLA monitoring client 120 may determine that the input measurements are valid if the distributed ledger 150 includes measurement attestations having hashes that match the hashes of the input measurements. In one embodiment, the SLA monitoring client 120 also verifies that the input measurements are valid as per the SLA terms. For example, the SLA monitoring client 120 may perform additional verifications that are not possible or too computationally expensive to perform within the protocol of the zero-knowledge proving scheme. This could include, for example, verifying that the input measurements came from trusted probes 140 and that they are from the correct time window (e.g., within the last hour) for the correct metrics. In one embodiment, the SLA monitoring client 120 verifies that the measurements have been acknowledged (e.g., that the SLA monitoring agent 110 acknowledged the reception of the measurements and the correctness of the measurement attestations stored by the trusted probes 140 in the distributed ledger 150).

At operation 23, the SLA monitoring client determines that the SLA fulfillment status reported by the SLA monitoring agent is valid/trustworthy if it is able to verify the proof and also verify the validity of the input measurements. Otherwise (if either the proof cannot be verified or the validity of the input measurements cannot be verified), then the SLA monitoring client 120 may determine that the SLA fulfillment status reported by the SLA monitoring agent 110 is invalid (and cannot be trusted).

In one embodiment, if there is a desire to integrate the SLA fulfillment status into the automated computations performed by smart contracts in the distributed ledger 150, the proof verification process can be integrated into the smart contracts themselves. While a certain order of operations is shown in the diagrams, such order is merely provided as an example. Other embodiments may use a different order of operations and/or combine certain operations to achieve the same/similar functionality.

Figure 3:
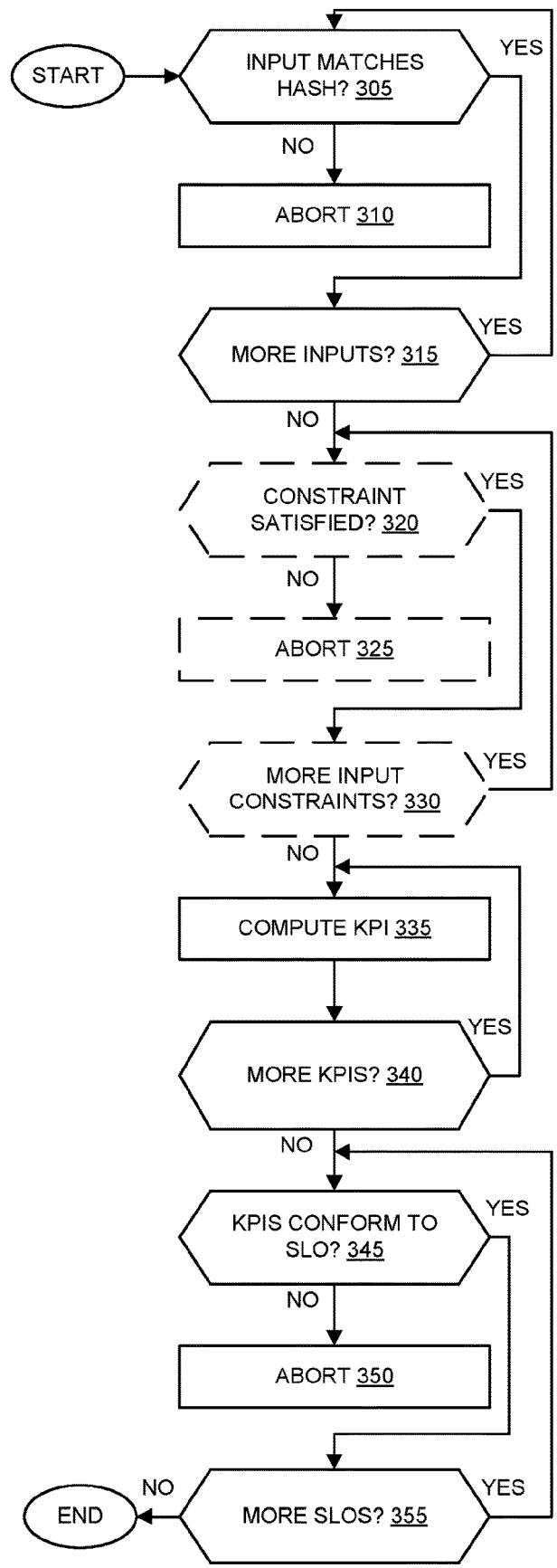
FIG. 3 is a flow diagram of a process for determining a SLA fulfillment status, according to some embodiments.

FIG. 3 is a flow diagram of a process for determining a SLA fulfillment status, according to some embodiments.

As mentioned above, the SLA fulfillment status determination process uses measurements as input. A desired property of embodiments is that they do not disclose the actual measurements themselves. Embodiments implement a scheme that allows the verifier (e.g., the service consumer) to check that the measurements used in the SLA fulfillment status determination process match the ones that were collected by the trusted probes 140 without disclosing the actual measurement values themselves.

In one embodiment, for any input measurement passed into the SLA fulfillment status determination process, the hash (or another type of manipulation detection code) of the measurement is also passed into the process. Based on this, one of the first tasks of the process may be to verify that each input measurement is indeed the preimage of the corresponding hash input. For example, at block 305, the process checks whether an input measurement matches the hash of the measurement. If the input measurement does not match the hash of the measurement, then the process aborts and no proof is generated. Otherwise, if the input measurement matches the hash of the measurement, then at block 315, the process checks whether there are more input measurements to verify. If so, the process proceeds back to block 305 for the next input measurement. Otherwise, if all input measurements have been processed/validated the process proceeds to block 335 (or optionally block 320).

In one embodiment, additional validations can be performed on the input measurements. For example, at block 320, the process may determine whether the input measurements satisfy a constraint (e.g., authenticate their provenance and/or verify their timestamp is within an acceptable range). If the input measurements do not satisfy the constraint, then at block 325, the process aborts and no proof is generated. Otherwise, if the input measurements satisfy the constraint, then at block 330, the process determines whether there are more constraints to satisfy. If so, the process proceeds back to block 320 for the next constraint. Otherwise, if all constraints have been successfully checked, the process proceeds to block 335.

Some or all of the additional validations might be too computationally expensive to implement as part of the zero-knowledge protocol (e.g., the generation of the arithmetic circuits might become too long to be practical). Thus, in one embodiment, the additional validations are performed separately from the zero-knowledge protocol, and hence omitted from this process.

After the input measurements are validated, the process may compute the KPIs that are needed to determine the SLA fulfillment status based on the input measurements. For example, at block 335, the process may compute a KPI. At block 340, the process may determine whether there are more KPIs to compute. If so, the process proceeds back to block 335 to compute the next KPI. Otherwise, if all KPIs have been computed, the process proceeds to block 345. The computed KPIs may only be used during the proof generation process and not disclosed in the proof or with the proof. As a result, only the prover (e.g., the service provider) may be exclusively in possession of these KPIs.

After the KPIs are computed, the process may determine whether the KPIs conform to the SLOs. For example, at block 345, the process determines whether the KPIs conform to a SLO (e.g., meets the target value specified by the SLO). If the KPIs do not conform to the SLO, the process aborts and no proof is generated (in some embodiments, instead of aborting the process, an output indicating the level of SLA fulfillment is generated). Otherwise, if the KPIs conform to the SLO, then at block 355, the process determines whether there are more SLOs. If so, the process proceeds back to block 345 for the next SLO. Otherwise, if there are no more SLOs, then the process ends.

If the process successfully completes, it can return an output indicating that the SLA has been fulfilled or a more verbose output indicating the level of SLA fulfillment (e.g., a good, medium, or bad grade based on how many SLOs were satisfied). This return value (e.g., which indicates the SLA fulfillment status) may be provided in cleartext along with the proof and the hashes of the measurements.

In some embodiments, other inputs beyond the measurements of the infrastructure 130 are used to determine the SLA fulfillment status. For example, details about the infrastructure such as the number of nodes and locations of nodes in the infrastructure could be used to determine the SLA fulfillment status. Such information could also be provided by trusted entities and could be the result of an audit rather that a measurement collection.

In one embodiment, the SLOs are private to the service provider and the service consumer, and information about the SLOs (e.g., the target KPI values) are passed as input to the SLA fulfillment status determination process. The information about the SLOs may be controlled in a similar fashion as the input measurement (e.g., notarized in the distributed ledger 150 and hashes provided with the proof) to maintain the privacy/secrecy of the SLOs.

Three types of information may have the potential of being disclosed as part of the SLA fulfillment status monitoring: (1) the measurements, (2) the SLOs, and (3) the SLA fulfillment status determination process. Embodiments may keep one or more of these private/secret, as described below.

Measurements: The program adapted for the proving scheme (e.g., the arithmetic circuit for the zero-knowledge proof) may be defined as not disclosing the measurements themselves but disclosing the hashes of the measurements. The SLA fulfillment status determination process can be disclosed for anyone to be able to generate the program adapted for the proving scheme themselves.

Service Level Objective: This can be seen as an extension of hiding the measurements. Instead of hardcoding the SLOs in the program adapted for the proving scheme (e.g., the arithmetic circuit), the information about the SLOs are passed as input and "protected" similarly to the measurements. Again, the SLA fulfillment status determination process can be disclosed for anyone to be able to generate the program adapted for the proving scheme themselves.

SLA fulfillment status determination process: The SLA fulfillment status determination process may be kept hidden so that it is only available to certain entities (e.g., only known to the service provider and service consumer) so that only these entities are able to generate the program adapted for the proving scheme (e.g., the arithmetic circuit). The program adapted for the proving scheme may be shared publicly (e.g., via the distributed ledger 150) so that other entities that can use it to generate the proving and/or verification keys. It might be possible for another entity to reverse-engineer the SLA fulfillment status determination process based on analyzing the program adapted for the proving scheme. However, this creates a much high barrier to entry in being able to understand the details of the SLA fulfillment status determination process (e.g., which metrics are being used, the KPIs being computed, etc.).

Embodiments may thus integrate non-interactive zero-knowledge proofs with a distributed ledger to allow a service provider to provide proofs of its fulfillment of the SLA without disclosing the nature and values of the measurements/metrics, KPIs, or even the SLOs being used to determine the SLA fulfillment status.

Example Formalism

A formalism for expressing the functions/materials used in the proving scheme is provided below. It should be understood that this formalism is provided by way of example and is not intended to limit embodiments in any way.

The zero-knowledge proving scheme may have the following algorithms/functions:

A Key Generation Algorithm: G (lambda, C)→(pk, vk)

lambda: secret parameter (this should be kept secret as it allows to generate fake proofs)

C: program adapted for the proving scheme (e.g. arithmetic circuit)

pk: Proving key vk: verification key

A Prover Algorithm: P(pk, x, w, C)→prf pk: proving key x: public input w: private input (witness)

C: program adapted for the proving scheme (e.g. arithmetic circuit)

prf: proof

A Verifier Algorithm V(vk, x, prf)

vk: verification key x: public input prf: proof

Embodiments may add the following algorithms/functions to support proof generation/validation.

Program Generator Algorithm: PG (s)→C s: the SLA as described in the distributed ledger C: program adapted for the proving scheme (e.g. arithmetic circuit)

Witness Generator Algorithm: W (m, h, slo, s)→(x, w)

s: the SLA as described in the distributed ledger slo: the SLO if it is not included in the public description of the SLA m: measurements h: hashes of the measurements x: public proof input (in a format acceptable by the prover algorithm)

w: private proof input (witness) (in a format acceptable by the prover algorithm)

Table I shows operations performed by different entities and the information stored by those entities in terms of the formalism, according to some embodiments. Depending on the embodiment, information indicated as being optional may not need to be stored in the corresponding entity, as will be described below.

| | Public Knowledge | SLA Monitoring Client | SLA Monitoring Agent |
|---|---|---|---|
| SLA Negotiation phase | SLA fulfillment status determination process (optional) | SLO (optional) SLA fulfillment status determination process (optional) | SLO (optional) SLA fulfillment status determination process (optional) |
| SLA Monitoring client program generation | SLA fulfillment status determination process (optional) | Use PG to generate C based on the SLA fulfillment status determination process from the distributed ledger/local database (and push it to the distributed ledger) C SLO (optional) SLA fulfillment status determination process (optional) | SLO (optional) SLA fulfillment status determination process (optional) |
| SLA Monitoring client keys generation | SLA fulfillment status determination process (optional) pk vk | Choose a secret value/lambda and apply G to get pk and vk. Submit pk and vk to the distributed ledger. Discard secret value/lambda. C pk vk SLO (optional) SLA fulfillment status determination process (optional) NOTE: If multiple parties want assurance that the secret value/lambda is properly discarded, this step can be achieved using multiparty computing, and the secret value/lambda is irrecoverable as long as one party discards the material they used in the computation. NOTE: The client does not need to execute the arithmetic circuit in this step. In some embodiments, the client never executes the arithmetic circuit. | SLO (optional) SLA fulfillment status determination process (optional) |
| SLA Monitoring agent program generation | SLA fulfillment status determination process (optional) pk vk | C pk vk SLO (optional) SLA fulfillment status determination process (optional) | Use PG to generate C based on the SLA fulfillment status determination process from the distributed ledger/ local database. It is the same as the C that is generated by the client. C SLO (optional) SLA fulfillment status determination process (optional) NOTE: The agent independently generates the program based on the information from the distributed ledger, which is the base that is agreed upon between the service |

| | Public Knowledge | SLA Monitoring Client | SLA Monitoring Agent |
|---|---|---|---|
| | | | consumer and the service provider. The reason for doing this is that the agent may not trust the value generated by the client to be valid. |
| SLA Monitoring agent proving key fetching | SLA fulfillment status determination process (optional) pk vk | C pk vk SLO (optional) SLA fulfillment status determination process (optional) | Get Pk from the distributed ledger C pk SLO (optional) SLA fulfillment status determination process (optional) |
| Metric Collection | Trusted probes provide the hashes of the measurements SLA fulfillment status determination process (optional) pk vk h | C pk vk SLO (optional) SLA fulfillment status determination process (optional) | Get the measurements from the trusted probes (and pre-compute the corresponding hashes) C pk m h SLO (optional) SLA fulfillment status determination process (optional) |
| Proof Generation (1/2) | SLA fulfillment status determination process (optional) pk vk h | C pk vk SLO (optional) SLA fulfillment status determination process (optional) | Generate the materials needed for the proof using W on the measurements, hashes, SLA fulfillment status determination process and optionally SLO. C pk m h w x SLO (optional) SLA fulfillment status determination process (optional) |
| Proof Generation (2/2) | SLA fulfillment status determination process (optional) pk vk h Prf x | C pk vk SLO SLA fulfillment status determination process (optional) | Generate the Proof using P on the program, proving key, public and private inputs (witness). Put the proof (and x) in the distributed ledger. C pk m h w x prf SLO (optional) SLA fulfillment status determination process (optional) |
| ZK Proof verification | SLA fulfillment status determination process (optional) pk vk h prf x | Fetch the proof (prf and x) from the distributed ledger. Verify the validity of the ZK proof using V on x, vk, and prf C pk vk prf x SLO (optional) SLA fulfillment status determination process (optional) | C pk m h w x prf SLO (optional) SLA fulfillment status determination process (optional) |

-continued

| | Public Knowledge | SLA Monitoring Client | SLA Monitoring Agent |
|---|---|---|---|
| Additional measurement constraints validation | SLA fulfillment status determination process (optional)<br>pk<br>vk<br>h<br>prf<br>x | Fetch the hashes used in the public input (x) from the distributed ledger (and the associated metadata).<br>Verify any constraints defined in the SLA fulfillment status determination process regarding the validity of the measurements.<br>C<br>pk<br>vk<br>prf<br>X<br>h<br>SLO (optional)<br>SLA fulfillment status determination process (optional) | C<br>pk<br>m<br>h<br>w<br>x<br>prf<br>SLO (optional)<br>SLA fulfillment status determination process (optional) |

Depending on the desired privacy guarantee there can be some slight variations, as described below.

To hide the measurements (but not the SLOs): The SLA fulfillment status determination process is public and stored in the distributed ledger. The SLA fulfillment status determination process includes the hard-coded thresholds of the SLOs.

To hide the measurement and the SLOs: The SLA fulfillment status determination process is public and stored in the distributed ledger. Information about the SLOs (e.g., the SLO thresholds/target values) are only known to the service provider and service consumer. The SLO hashes are stored in the SLA fulfillment status determination process instead of the cleartext values. Information about the SLOs are private inputs to the SLA fulfillment status determination process and protected against modification using hashes, similar to what is done for the measurements.

To hide the SLA fulfillment status determination process: The SLA fulfillment status determination process is not public and only known to the service provider and the service consumer. Verifying the validity of a proof requires access to the verification key, proof, and public input.

Figure 4:
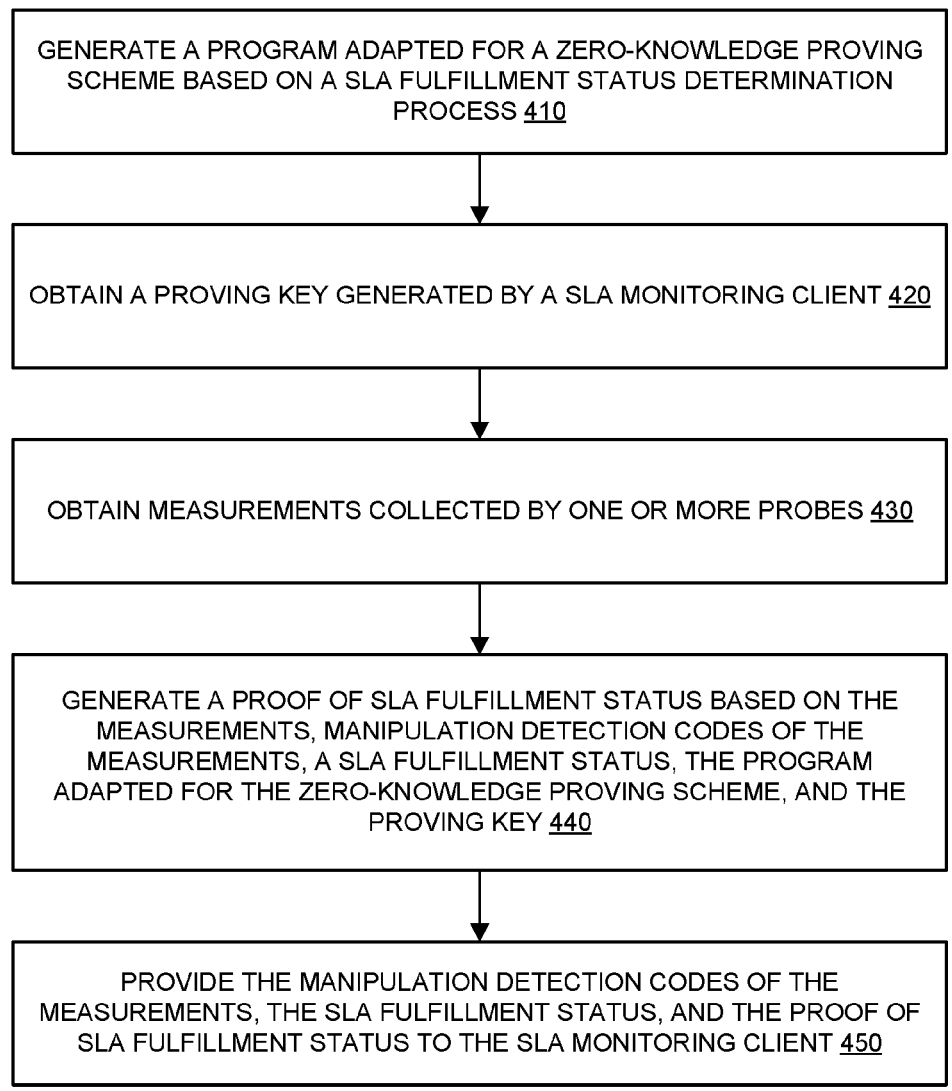
FIG. 4 is a flow diagram of a process by a SLA monitoring agent to provide a proof of SLA fulfillment status to a SLA monitoring client, according to some embodiments.

FIG. 4 is a flow diagram of a process by a SLA monitoring agent to provide a proof of SLA fulfillment status to a SLA monitoring client, according to some embodiments. The process may be implemented by one or more computing devices implementing the SLA monitoring agent. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

At block 410, the SLA monitoring agent generates a program adapted for a zero-knowledge proving scheme based on a SLA fulfillment status determination process. In one embodiment, the zero-knowledge proving scheme is ZK-SNARK and the program adapted for the zero-knowledge proving scheme is an arithmetic circuit.

At block 420, the SLA monitoring agent obtains a proving key generated by a SLA monitoring client.

At block 430, the SLA monitoring agent obtains measurements collected by one or more probes. In one embodiment, the one or more probes store measurement attestations corresponding to the measurements in a distributed ledger. In one embodiment, the SLA monitoring agent acknowledges, using a distributed ledger, reception of the measurements and correctness of measurement attestations stored by the one or more probes.

At block 440, the SLA monitoring agent generates a proof of SLA fulfillment status based on the measurements, manipulation detection codes of the measurements (e.g., hashes of the measurements), a SLA fulfillment status, the program adapted for the proving scheme, and the proving key.

At block 450, the SLA monitoring agent provides the manipulation detection codes of the measurements, the SLA fulfillment status, and the proof of SLA fulfillment status to the SLA monitoring client. In one embodiment, the manipulation detection codes of the measurements, the SLA fulfillment status, and the proof of SLA fulfillment status are provided to the SLA monitoring client based on storing the manipulation detection codes of the measurements, the SLA fulfillment status, and the proof of SLA fulfillment status in a distributed ledger.

In one embodiment, the SLA fulfillment status determination process determines whether the manipulation detection codes of the measurements correspond to the measurements. In one embodiment, the SLA fulfillment status determination process takes SLO information and manipulation detection codes of the SLO information as input, wherein the proof of SLA fulfillment status is further generated based on the SLO information and the manipulation detection codes of the SLO information (e.g., to help hide the SLO).

Figure 5:
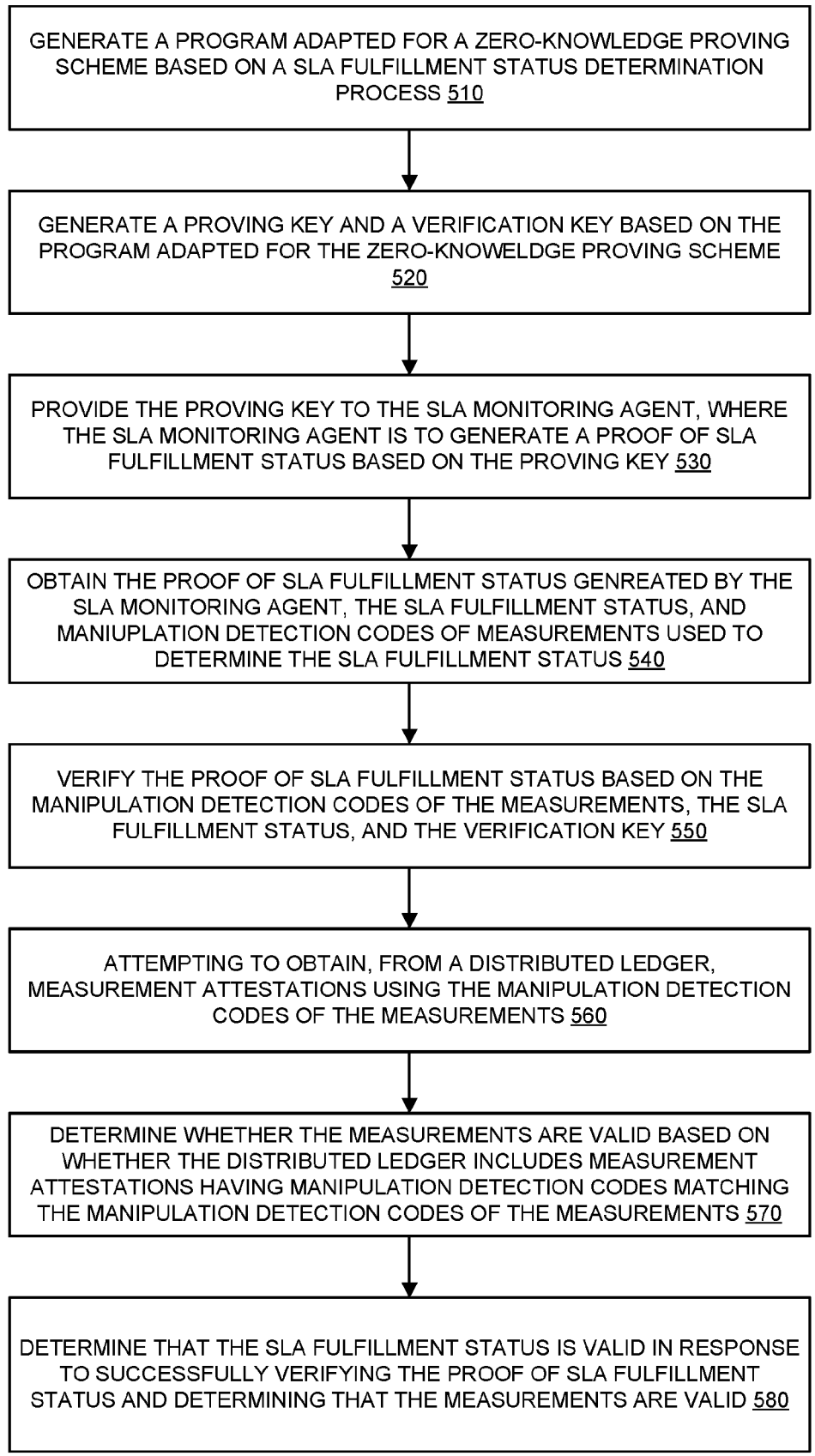
FIG. 5 is a flow diagram of a process by a SLA monitoring client to determine whether a SLA fulfillment status reported by a SLA monitoring agent is valid, according to some embodiments.

FIG. 5 is a flow diagram of a process by a SLA monitoring client to determine whether a SLA fulfillment status reported by a SLA monitoring agent is valid, according to some embodiments. The process may be implemented by one or more computing devices implementing the SLA monitoring client.

At block 510, the SLA monitoring client generates a program adapted for a zero-knowledge proving scheme based on a SLA fulfillment status determination process. In one embodiment, the zero-knowledge proving scheme is ZK-SNARK and the program adapted for the zero-knowledge proving scheme is an arithmetic circuit.

At block 520, the SLA monitoring client generates a proving key and a verification key based on the program adapted for the zero-knowledge proving scheme. In one embodiment, the proving key and the verification key are generated using a decentralized process involving collaboration between the SLA monitoring client and one or more other entities.

At block 530, the SLA monitoring client provides the proving key to the SLA monitoring agent, where the SLA monitoring agent is to generate a proof of SLA fulfillment status based on the proving key. In one embodiment, the proving key is provided to the SLA monitoring agent based on storing the proving key in the distributed ledger.

At block 540, the SLA monitoring client obtains the proof of SLA fulfillment status generated by the SLA monitoring agent, the SLA fulfillment status, and manipulation detection codes of measurements used to determine the SLA fulfillment status (e.g., hashes of the measurements).

At block 550, the SLA monitoring client verifies the proof of SLA fulfillment status based on the manipulation detection codes of the measurements, the SLA fulfillment status, and the verification key.

At block 560, the SLA monitoring client attempts to obtain, from a distributed ledger, measurement attestations using the manipulation detection codes of the measurements (e.g., measurement attestations stored by one or more (trusted) probes).

At block 570, the SLA monitoring client determines whether the measurements are valid based on whether the distributed ledger includes measurement attestations having manipulation detection codes matching the manipulation detection codes of the measurements. In one embodiment, the measurements are determined to be valid further based on a determination that metadata included in the measurement attestations conform to rules included in the SLA.

At block 580, the SLA monitoring client determines that the SLA fulfillment status is valid/trustworthy in response to successfully verifying the proof of SLA fulfillment status and determining that the measurements are valid.

In one embodiment, the SLA fulfillment status determination process determines whether the manipulation detection codes of the measurements correspond to the measurements used to determine the SLA fulfillment status. In one embodiment, the SLA fulfillment status determination process takes SLO information and manipulation detection codes of the SLO information as input, wherein the proof of SLA fulfillment status is further verified based on the manipulation detection codes of the SLO information (e.g., to help hide the SLO).

Figure 6A:
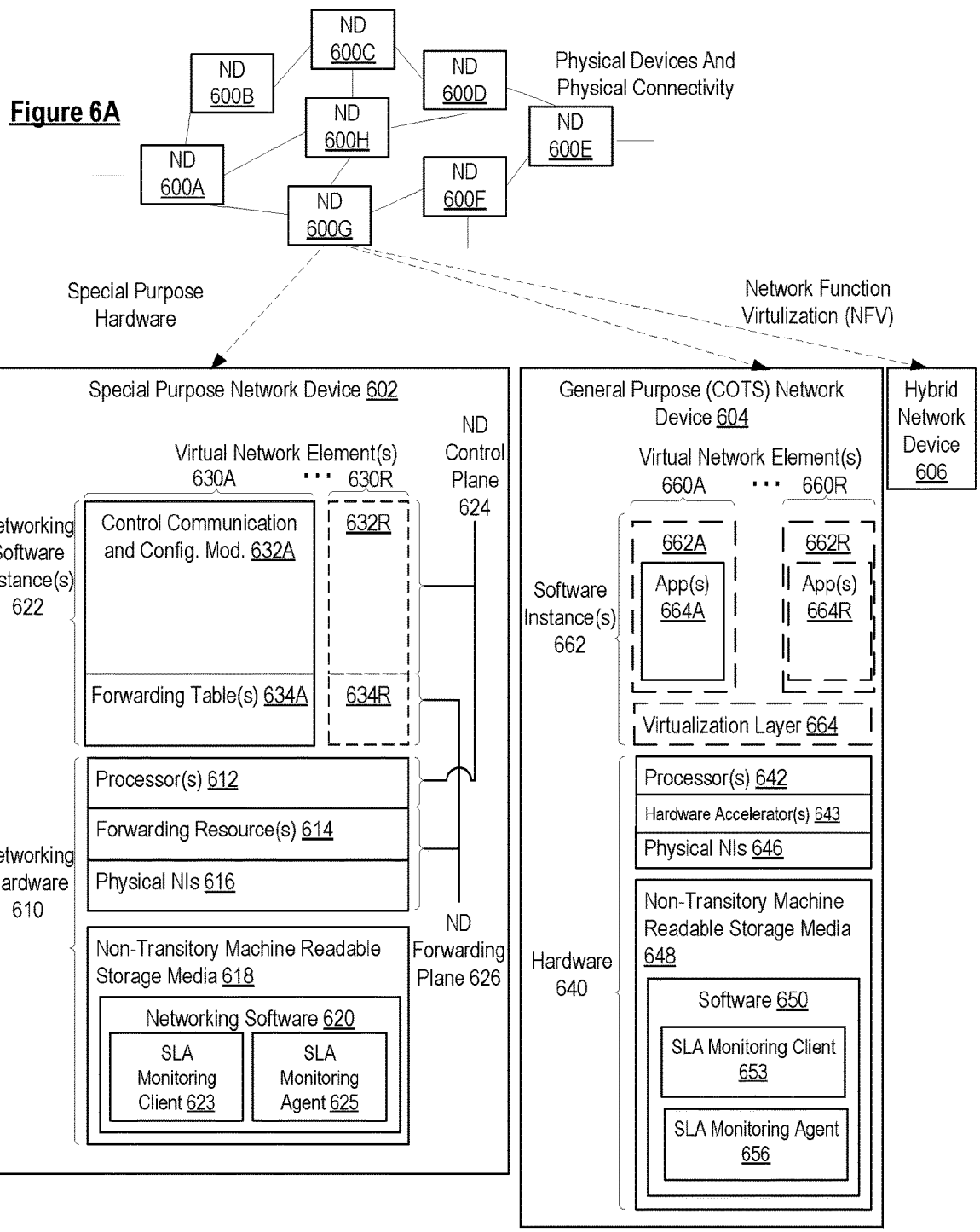
FIG. 6A illustrates connectivity between network devices (NDs) within an exemplary network, as well as three exemplary implementations of the NDs, according to some embodiments.

FIG. 6A illustrates connectivity between network devices (NDs) within an exemplary network, as well as three exemplary implementations of the NDs, according to some embodiments. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs, while the other NDs may be called core NDs).

Two of the exemplary ND implementations in FIG. 6A are: 1) a special-purpose network device 602 that uses custom application specific integrated circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

In one embodiment software 620 includes code such as SLA monitoring client 623 and/or SLA monitoring agent 625, which when executed by networking hardware 610, causes the special-purpose network device 602 to perform operations of one or more embodiments of the present invention as part of networking software instances 622 (e.g., to generate proofs of SLA fulfillment status and/or to verify proofs of SLA fulfillment status).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
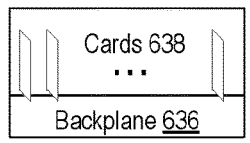
FIG. 6B illustrates an exemplary way to implement a special-purpose network device, according to some embodiments.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R— e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

In one embodiment, software 650 includes code for a SLA monitoring client 653 and/or SLA monitoring agent 656, which when executed by processor(s) 642, causes the general purpose network device 604 to perform operations of one or more embodiments of the present invention as part of software instances 662A-R (e.g., to generate proofs of SLA fulfillment status and/or verify proofs of SLA fulfillment status).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes, where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable storage medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by a computing system implementing a service level agreement (SLA) monitoring client to determine whether a SLA fulfillment status reported by a SLA monitoring agent is valid, the method comprising:

obtaining a program adapted for a zero-knowledge proving scheme that was generated based on a SLA fulfillment status determination process;

obtaining a verification key that was generated based on the program adapted for the zero-knowledge proving scheme, wherein the SLA monitoring agent is to generate a proof of SLA fulfillment status based on a proving key that was generated based on the program adapted for the zero-knowledge proving scheme;

obtaining the proof of SLA fulfillment status generated by the SLA monitoring agent, the SLA fulfillment status, and manipulation detection codes of measurements used to determine the SLA fulfillment status;

verifying the proof of SLA fulfillment status based on the manipulation detection codes of the measurements, the SLA fulfillment status, and the verification key;

attempting to obtain, from a distributed ledger, measurement attestations using the manipulation detection codes of the measurements;

determining whether the measurements are valid based on whether the distributed ledger includes measurement attestations having manipulation detection codes matching the manipulation detection codes of the measurements; and determining that the SLA fulfillment status is valid in response to successfully verifying the proof of SLA fulfillment status and determining that the measurements are valid.

2. The method of claim 1, wherein the zero-knowledge proving scheme is zero-knowledge succinct non-interactive argument of knowledge (ZK-SNARK) and the program adapted for the zero-knowledge proving scheme is an arithmetic circuit.

3. The method of claim 1, wherein the proving key is provided to the SLA monitoring agent based on storing the proving key in the distributed ledger.

4. The method of claim 1, wherein the proving key and the verification key are generated using a decentralized process involving collaboration between the SLA monitoring client and one or more other entities.

5. The method of claim 1, wherein the measurements are determined to be valid further based on a determination that metadata included in the measurement attestations conform to rules included in the SLA.

6. The method of claim 1, wherein the SLA fulfillment status determination process determines whether the manipulation detection codes of the measurements correspond to the measurements used to determine the SLA fulfillment status.

7. The method of claim 6, wherein the SLA fulfillment status determination process takes service level object (SLO) information and manipulation detection codes of the SLO information as input, wherein the proof of SLA fulfillment status is further verified based on the manipulation detection codes of the SLO information.

8. A method by a computing system implementing a service level agreement (SLA) monitoring agent to provide a proof of SLA fulfillment status to a SLA monitoring client, the method comprising:

obtain a program adapted for a zero-knowledge proving scheme that was generated based on a SLA fulfillment status determination process;

obtaining a proving key that was generated based on the program adapted for the zero-knowledge proving scheme;

obtaining measurements collected by one or more probes;

generating the proof of SLA fulfillment status based on the measurements, manipulation detection codes of the measurements, a SLA fulfillment status, the program adapted for the zero-knowledge proving scheme, and the proving key; and providing the manipulation detection codes of the measurements, the SLA fulfillment status, and the proof of SLA fulfillment status to the SLA monitoring client.

9. The method of claim 8, wherein the zero-knowledge proving scheme is zero-knowledge succinct non-interactive argument of knowledge (ZK-SNARK) and the program adapted for the zero-knowledge proving scheme is an arithmetic circuit.

10. The method of claim 8, further comprising:

acknowledging, using a distributed ledger, reception of the measurements and correctness of measurement attestations stored by the one or more probes.

11. The method of claim 8, wherein the SLA fulfillment status determination process determines whether the manipulation detection codes of the measurements correspond to the measurements.

12. The method of claim 11, wherein the SLA fulfillment status determination process takes service level objective (SLO) information and manipulation detection codes of the SLO information as input, wherein the proof of SLA fulfillment status is further generated based on the SLO information and the manipulation detection codes of the SLO information.

13. The method of claim 8, wherein the manipulation detection codes of the measurements, the SLA fulfillment status, and the proof of SLA fulfillment status are provided to the SLA monitoring client based on storing the manipulation detection codes of the measurements, the SLA fulfillment status, and the proof of SLA fulfillment status in a distributed ledger.

14. The method of claim 8, wherein the one or more probes store measurement attestations corresponding to the measurements in a distributed ledger.

15. A set of non-transitory machine-readable media having computer code stored therein, which when executed by a set of one or more processors of a network device implementing a service level agreement (SLA) monitoring client, causes the network device to perform operations for determining whether a SLA fulfillment status reported by a SLA monitoring agent is valid, the operations comprising:

obtaining a program adapted for a zero-knowledge proving scheme that was generated based on a SLA fulfillment status determination process;

obtaining a verification key that was generated based on the program adapted for the zero-knowledge proving scheme, wherein the SLA monitoring agent is to generate a proof of SLA fulfillment status based on a proving key that was generated based on the program adapted for the zero-knowledge proving scheme;

obtaining the proof of SLA fulfillment status generated by the SLA monitoring agent, the SLA fulfillment status, and manipulation detection codes of measurements used to determine the SLA fulfillment status;

verifying the proof of SLA fulfillment status based on the manipulation detection codes of the measurements, the SLA fulfillment status, and the verification key;

attempting to obtain, from a distributed ledger, measurement attestations using the manipulation detection codes of the measurements;

determining whether the measurements are valid based on whether the distributed ledger includes measurement attestations having manipulation detection codes matching the manipulation detection codes of the measurements; and determine that the SLA fulfillment status is valid in response to successfully verifying the proof of SLA fulfillment status and determining that the measurements are valid.

16. The set of non-transitory machine-readable media of claim 15, wherein the zero-knowledge proving scheme is zero-knowledge succinct non-interactive argument of knowledge (ZK-SNARK) and the program adapted for the zero-knowledge proving scheme is an arithmetic circuit.

17. The set of non-transitory machine-readable media of claim 15, wherein the measurements are determined to be valid further based on a determination that metadata included in the measurement attestations conform to rules included in the SLA.

18. A set of non-transitory machine-readable media having computer code stored therein, which when executed by a set of one or more processors of a network device implementing a service level agreement (SLA) monitoring agent, causes the network device to perform operations for providing a proof of SLA fulfillment status to a SLA monitoring client, the operations comprising:
- obtaining a program adapted for a zero-knowledge proving scheme that was generated based on a SLA fulfillment status determination process;
- obtaining a proving key that was generated based on the program adapted for the zero-knowledge proving scheme;
- obtaining measurements collected by one or more probes;
- generating the proof of SLA fulfillment status based on the measurements, manipulation detection codes of the measurements, a SLA fulfillment status, the program adapted for the zero-knowledge proving scheme, and the proving key; and
- providing the manipulation detection codes of the measurements, the SLA fulfillment status, and the proof of SLA fulfillment status to the SLA monitoring client.

19. The set of non-transitory machine-readable media of claim 18, wherein the zero-knowledge proving scheme is zero-knowledge succinct non-interactive argument of knowledge (ZK-SNARK) and the program adapted for the zero-knowledge proving scheme is an arithmetic circuit.

20. The set of non-transitory machine-readable media of claim 18, wherein the SLA fulfillment status determination process determines whether the manipulation detection codes of the measurements correspond to the measurements.

* * * * *